United States Patent
Jenkins et al.

(10) Patent No.: US 11,765,224 B1
(45) Date of Patent: Sep. 19, 2023

(54) MANAGEMENT OF DEVICES IN A SMART ENVIRONMENT

(71) Applicants: Jana H. Jenkins, Raleigh, NC (US); Jeremy R. Fox, Georgetown, TX (US); Sarbajit K. Rakshit, Kolkata (IN); Tushar Agrawal, West Fargo, ND (US)

(72) Inventors: Jana H. Jenkins, Raleigh, NC (US); Jeremy R. Fox, Georgetown, TX (US); Sarbajit K. Rakshit, Kolkata (IN); Tushar Agrawal, West Fargo, ND (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/066,673

(22) Filed: Dec. 15, 2022

(51) Int. Cl.
*H04L 67/10* (2022.01)

(52) U.S. Cl.
CPC .................................. *H04L 67/10* (2013.01)

(58) Field of Classification Search
None
See application file for complete search history.

(56) References Cited

U.S. PATENT DOCUMENTS

| | | | |
|---|---|---|---|
| 11,195,138 B2 * | 12/2021 | Jenkins | G06Q 10/0633 |
| 2016/0162333 A1 | 6/2016 | Bostick | |
| 2018/0088564 A1 * | 3/2018 | Billi-Duran | G05B 19/41865 |
| 2019/0205839 A1 * | 7/2019 | Dotan-Cohen | H04L 67/535 |
| 2020/0019887 A1 * | 1/2020 | Cook | G06N 20/00 |
| 2020/0118194 A1 | 4/2020 | Greenberger | |
| 2020/0265048 A1 * | 8/2020 | Dotan-Cohen | G06F 16/24522 |
| 2021/0374032 A1 | 12/2021 | Rakshit | |
| 2022/0044538 A1 | 2/2022 | Al-Yousef | |
| 2022/0108262 A1 * | 4/2022 | Cella | G06Q 10/063118 |
| 2022/0138670 A1 * | 5/2022 | Goodman | G06Q 30/0202 705/7.31 |

OTHER PUBLICATIONS

Disclosed Anonymously, "System and Method for Process Discovery based on Movement Patterns of People or Objects", An IP.com Prior Art Database Technical Disclosure, IP.com No. IPCOM000198115D, IP.com Electronic Publication Date: Jul. 26, 2010, 8 pages.

Disclosed Anonymously, "Context Aware Workflow Automation in Any Multi-IoT Device Ecosystem", An IP.com Prior Art Database Technical Disclosure, IP.com No. IPCOM000270068D, IP.com Electronic Publication Date: May 31, 2022, 6 pages.

(Continued)

*Primary Examiner* — Quang N Nguyen
(74) *Attorney, Agent, or Firm* — Haley J. McClory

(57) ABSTRACT

A processor may receive workflow data associated with an environment having one or more smart devices. A processor may analyze the workflow data to identify one or more activities associated with the environment. A processor may generate an intelligent environment for one or more users using one or more intelligent environment (IE) devices. The one or more IE devices may be configured to collect user feedback from one or more users. A processor may modify at least one of the one or more activities in the environment based, at least in part, on the user feedback.

17 Claims, 4 Drawing Sheets

(56) References Cited

OTHER PUBLICATIONS

Disclosed Anonymously, "Method and System for Dynamic and Auto-Adaptive Workflow Creation", An IP.com Prior Art Database Technical Disclosure, IP.com No. IPCOM000262393D, IP.com Electronic Publication Date: May 26, 2020, 6 pages.

Disclosed Anonymously, "Method and System for Dynamically Restoring Automation Capability in Any Machine by Using a Second Machine", An IP.com Prior Art Database Technical Disclosure, IP.com No. PCOM000269433D, IP.com Publication Date: Apr. 17, 2022, 3 pages.

Li, Anran, "Developing a collaborative workflow from BIM to virtual reality", Undergraduate Honors Thesis, Stanford University, May 2015, 3 pages, <https://web.archive.org/web/20211027160740/http://architecture.mit.edu:80/publication/developing-collaborative-workflow-bim-virtual-reality>.

Maxey, Kyle, "BOXX Updates its MXL VR Mobile Workstation", Engineering.com, Feb. 24, 2017, 3 pages, <https://www.engineering.com/story/boxx-updates-its-mxl-vr-mobile-workstation>.

Singletary, Charles, "Adobe Shows Love For VR With New Updates To Creative Cloud's Workflow", UploadVR.com, Sep. 7, 2016, 2 pages, <https://uploadvr.com/adobe-shows-creative-cloud-vr-updates/>.

Smith, Colin, "ALIAS Create VR—New Modeling Workflow", Autodesk, Blog, Oct. 29, 2020, 2 pages, <https://blogs.autodesk.com/design-studio/2020/10/29/alias-create-vr-new-modeling-workflow/>.

Unknown, "Build intelligent workflows for digital transformation", IBM, last retrieved from internet Sep. 23, 2022, 13 pages, <https://www.ibm.com/services/resources/intelligent-workflows-smart-paper/>.

Unknown, "Four ways interactive technologies improve manufacturing workflows", Unity Technologies, last retrieved from internet Sep. 23, 2022, 4 pages, <https://resources.unity.com/automotive-transportation-manufacturing-content/four-ways-interactive-technologies-improve-manufacturing-workflows>.

Unknown, "Immersive workflows: The use of AR & VR in manufacturing", Industr.com, XR Immersive Enterprise 2020 Conference, Jan. 7, 2020, 4 pages, <https://www.industr.com/en/immersive-workflows-the-use-of-ar-vr-in-manufacturing-2466310>.

Unknown, "VR headset comparison Sep. 2022", UL Solutions, Benchmarks, last retrieved from internet Sep. 23, 2022, 3 pages, <https://benchmarks.ul.com/compare/best-vr-headsets>.

\* cited by examiner

MANAGEMENT OF DEVICES IN A SMART ENVIRONMENT

BACKGROUND

The present disclosure relates generally to environments, and more specifically to environments utilizing virtual reality (VR) and/or augmented reality (AR) devices.

The development of VR related technology has changed how people interact with various environments. As this technology has grown in popularity, so too has demand to make VR more available to solve daily problems. While many VR applications are associated with entertainment (e.g., video games), VR technology has also been adopted across industries to address various business needs.

SUMMARY

Embodiments of the present disclosure include a method, computer program product, and system for managing devices in a environment. A processor may receive workflow data associated with an environment having one or more smart devices. A processor may analyze the workflow data to identify one or more activities associated with the environment. A processor may generate an intelligent environment for one or more users using one or more intelligent environment (IE) devices. The one or more IE devices may be configured to collect user feedback from one or more users. A processor may modify at least one of the one or more activities in the environment based, at least in part, on the user feedback.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
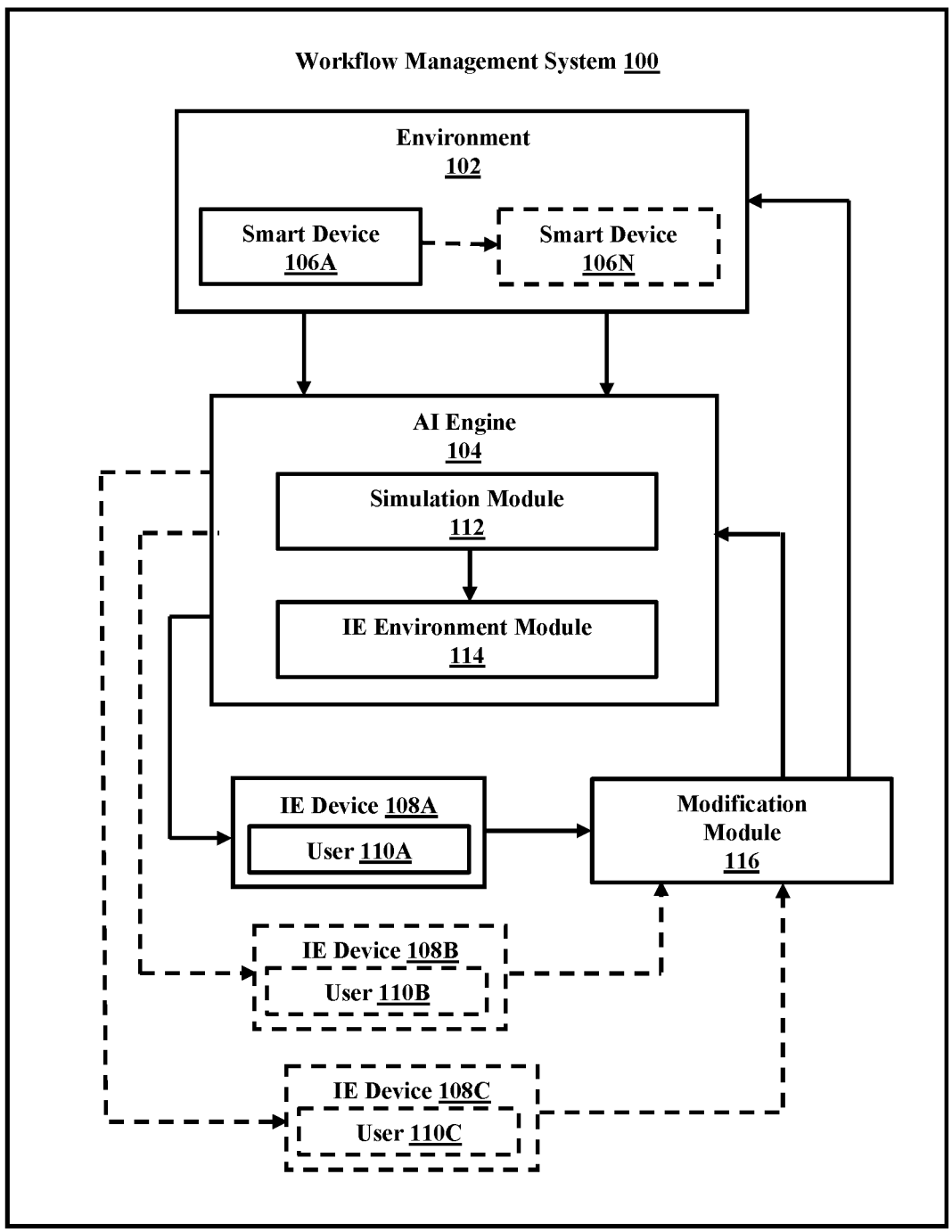
FIG. 1 depicts a block diagram of an embodiment of workflow management system, in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to environments, and more specifically environments utilizing virtual reality (VR) and/or augmented reality (AR) devices, such as AR and VR devices that may be utilized in a business workplace or industrial factory. While the present disclosure is not necessarily limited to such applications, various aspects of the disclosure may be appreciated through a discussion of various examples using this context.

VR and AR technology has evolved overtime to provide a plethora of solutions to everyday problems. VR and AR technology has not only enhanced various aspects of the entertainment industry (e.g., video games, movies, etc.) but has also been used to deliver solutions to other industries. One nontraditional industry VR and AR technology may benefit is the manufacturing industry. Often, the various activities associated with manufacturing are performed in a defined workflow within a factory. The defined workflow often requires the various manufacturing activities to be performed in a particular manner with minimal or no deviation from the original workflow. In some instances, there may be a flaw in the logic of the original workflow resulting in an inefficient workflow. While some flaws may be inherent in the workflow process, other flaws may arise due to issues with the equipment or supplies used to manufacture an object. As such, there is a desire for a solution that may enable a user to visualize the various activities or steps associated with a workflow in an intelligent environment (e.g., AR and/or VR environment) to determine if one or more modifications may be made to the workflow (e.g., modifications to one or more activities of the workflow) to reduce or eliminate potential hazards (e.g., injury or damage to objects in environment) and/or to optimize the workflow.

Before turning to the FIGs. it is noted that the benefits/novelties and intricacies of the proposed solution are that:

The workflow management system may be configured to navigate the logical workflow by navigating a virtual reality environment. The VR or IE environment may allow for the navigation of any process or set of one or more activities. The IE environment may also be configured to receive feedback from users interacting with the IE environment. this feedback may be used to control the defined workflow. The workflow management system may be configured to analyze the workflow sequences and navigates the VR content as per the workflow logic.

The workflow management system may be configured to perform IE workflow pattern amelioration for various processing steps. This may be based on any changes in the workflow steps, or any dynamic modification of the workflow. The workflow management system may identify these changes by analyzing different contextual situations. The workflow management system may be configured to dynamically control the navigation pattern of the VR content and aligns the same with the dynamically modified workflow.

The workflow management system may be configured to generate a IE pattern overlay evolution. The workflow management system may base this on one or more actions performed by the user while VR content is being navigated, and if the user overrides original VR content navigation pattern as per workflow, then the workflow management system may identify the modified logic or execution steps, and the associated workflow is also modified. A new version of the workflow may be created.

The workflow management system may be configured to generate IE parallel processing Patterns. The workflow may have many parallel execution paths of various activities. The workflow management system may be configured to allow multiple users to individually navigate the IE content. In these embodiments, the multiple users may be allowed to select respective parallel execution steps individually. The workflow management system may be configured to allow users to collaborate with other users based, at least in part, on the workflow.

The workflow management system may be configured to identify roles and responsibilities associated with the IE workflow. In these embodiments, the workflow management system may be configured to consider each user's role in the workflow. The workflow management system may be configured to enable users to navigate the content associated with the workflow.

The workflow management system may be configured to generate a historical workflow knowledge corpus. The workflow management system may be configured to collect and analyze historical workflow execution patterns, changes in capabilities of the activities, sequencing of activities, success and failure criteria based on IoT, image feed analysis, and may identify any change in contextual situation that may require modification to the workflow logic.

The workflow management system may be configured to analyze a workflow sequence. In these embodiments, the workflow management system may identify actual and potential changes in the steps or dynamic modifications. This may be based on the contextual situation of one or more users' overrides. Using this analysis and data generated (e.g., dynamically modified workflow logic), the workflow management system may be configured to generate VR content that can be used to navigate the workflow. The workflow management system may be configured to assist workflows. These workflows that have parallel execution activities or sub-processes where multiple actors can collaborate to accomplish the goal based on the role of actors in the workflow.

The workflow management system may be configured to tailor the VR content based on the role and responsibility associated with navigated workflow. The workflow management system may be configured to build a learning corpus for workflow execution patterns and changes that may occur during the execution. The learning corpus may be based on context, user intervention, and/or other historical information. In some embodiments, the workflow management system may be configured to predict modifications and update content navigation.

Referring now to FIG. 1, illustrated is a block diagram of an example workflow management system 100, in accordance with aspects of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments contemplated herein, workflow management system 100 may be configured to receive workflow data regarding a workflow. A workflow may refer to any process, such as a manufacturing process, that may be associated with one or more activities (e.g., operations, steps, stages, etc.). A workflow may include any partial process or complete process, such as a casting process or assembly process. For example, in a casting workflow these one or more activities may include, but are not limited to, setup processes, stress processes, determining if a concrete hopper free, concrete production, curing process, finishing work process, and moving the casted object to a storage are. The workflow may be performed in environment 102 configured with one or more smart devices to collect/receive workflow data associated with the workflow.

In some embodiments, a user may be prevented from inspecting or otherwise viewing one or more of the activities due to the nature of the activity (e.g., high temperatures associated with a curing process would prevent a user from observing the curing take place). In such embodiments, workflow management system 100 may use the collected/received workflow data to generate an intelligent environment (IE) for one or more users. In these embodiments, workflow management system 100 may be configured to receive user feedback (e.g., user determines that the kiln is not rising to the appropriate curing temperature during the curing process). Workflow management system 100 may be configured to modify (e.g., based on user feedback) at least one of the one or more activities in the (e.g., activating a backup kiln to perform curing process).

In embodiments, workflow management system 100 may include environment 102 and AI engine 104. Workflow management system 100 may be configured to collect/receive workflow data associated with an environment 102. Environment 102 may refer to any space or number of spaces, such as a workspace or workspaces (e.g., manufacturing workspaces that may span multiple floors) where one or more devices or pieces of equipment are used to perform a workflow or process. For example, a may include an industrial workspace where an object is manufactured using a particular workflow. A workflow may include one or more activities (e.g., one or more activities are preformed to manufacture an object). The one or more activities may refer to any number of steps, operations, and/or stages or combination thereof that may be used to manufacture the object. These steps, operations, and/or steps may be performed by one or more pieces of equipment (e.g., one or more devices). While the equipment/devices used may include any device that is utilized as part of the workflow, in other embodiments, the equipment/devices may also include devices that may be used as a backup or alternative to one or more equipment/devices. For example, the one or more equipment/devices may include additive machinery, subtractive machinery, heating units (e.g., kilns), cooling units, casting/molding equipment, devices associated with moving objects or units (e.g., conveyor belts, robotic arms, etc.), drying units, or any combination thereof.

In embodiments, workflow management system 100 may be configured to collect/receive workflow data from one or more smart device 106A-N (e.g., depicted as smart devices 106A-106N) configured in environment 102. One or more smart devices 106A-N may include any number or combination of IoT devices/feeds, ultrasound, infrared cameras, various sensors (e.g., temperature and/or chemical sensors), or any other similarly configured smart device capable of collecting workflow data. While in some embodiments, one or more smart devices 106A-N may be independently and separately configured within environment 102, in other embodiments, one or more smart devices 106A-N may be configured within one or more other devices. For example, one or more smart devices 106A-N may be independently configured and positioned at particular points throughout environment 102 as well as being configured within or as part of various pieces of equipment that may be used to perform one or more activities associated with the workflow (e.g., a temperature sensor may be configured within a heating element). In some embodiments, one or more smart devices 106A-N may be positioned within or as a component of IE devices 108A-C. In these embodiments, workflow management system 100 may be configured to collect/receive workflow data associated with one or more users and their interactions with the IE environment (e.g., user feedback). Alternatively, in some embodiments, one or more smart devices 106A-N may be positioned within the area where the IE environment is displayed to the one or more users to collect/receive workflow data associated with one or more users.

In embodiments, workflow data may include any information or data that may be used to perform the various analyses contemplated herein. For example, workflow data may include, but is not limited to, information such as: i) the various steps and processes associated with the workflow (e.g., flowcharts associated with the workflow design during object manufacturing/construction); ii) information associated with the various equipment or chemical processes used during the workflow (e.g., technical information associated with each piece of equipment); iii) equipment/device status or health (e.g., is the equipment/device available for use or may require maintenance); iv) user data (e.g., user feedback regarding the workflow); v) how equipment/device may be altered and/or what alternative equipment may be used to perform the same or similar function; vi) real-time information associated with environment 102 and the one or more activities (e.g., process steps, operations, stages etc.) of the workflow); vii) historical workflow data stored in a historical repository (e.g., workflow data collected over time); viii) information/data generated from various analyses and/or simulations contemplated herein (e.g., information/data generated by AI and machine learning analysis via simulation engine 112 and IE environment module 114); ix) information associated with environment 102 (e.g., various aspects of environment 102 that may impact the workflow and the one or more activates); x) databases having information/data associated with disassembling/deconstruction of the same or similar objects; xi) data associated with potential impacts/affects to the workflow if one or more modifications are made.

In embodiments, workflow management system 100 may be configured to store historical workflow (e.g., collected by one or more smart devices 108A-C) data in a historical repository. The historical repository may include any workflow data contemplated herein. In embodiments, object disassembly system 100 may access the historical repository to generate one or more simulations using AI and machine learning capabilities (e.g., via simulation module 112 and/or IE environment module 114). The information used and generated from these analyses may be considered workflow data and may also be stored within the historical repository.

In embodiments, workflow management system 100 may be configured to analyze the workflow data to identify one or more activities associated with the environment 102 using AI engine 104. AI engine 104 may be enabled using AI and machine learning techniques and configured to perform any analyses contemplated herein. AI engine 105 may include simulation module 112 and intelligent environment module 114. Simulation module 112 may be configured to receive and analyze workflow data to generate one or more simulations of the workflow and/or environment 102. In these embodiments, workflow management system 100 may collect workflow data from the one or more smart devices 106A-N (e.g., real-time feed representing the current state of the equipment/devices and the workflow) and the historical repository to generate one or more simulations of the one or more activities of the workflow performed in environment 102. The one or more simulations may represent different aspects of the workflow and the one or more activities.

In embodiments, workflow management system 100 may be configured to generate an intelligent environment for one or more users using intelligent environment (IE) module 114. IE module 114 may use the one or more simulations generated using simulation module 112 to generate the intelligent environment. The intelligent environment may be a VR and/or AR representation of the workflow, the one or more activities, and/or environment 102. In some embodiments, the intelligent environment may display the one or more activities of the workflow as the workflow is performed in environment 102. In some embodiments, the intelligent environment may display how various aspects associated with environment 102 may impact the workflow (e.g., equipment/device placement may impact efficiency). In some embodiments, various parameters, such as temperature, pressure, and chemical concentrations, may be displayed within the intelligent environment (e.g., the VR and/or AR representation of the workflow) alongside the one or more equipment/devices performing the one or more activities associated with those parameters.

In embodiments, workflow management system 100 may be configured to display the intelligent environment (e.g., workflow, one or more activities, and/or environment 102) to the one or more users using IE devices 108A-C (depicted as IE device 108A, IE device 108B, IE device 108C). While FIG. 1 only depicts IE device 108A, IE device 108B, IE device 108C, any number of IE devices may be used. IE device 108A-C may include any device that may be configured to display augmented reality (AR) and/or virtual reality (VR) environments. Such IE devices 108A-C may include, but are not limited to, AR/VR configured headsets, AR/VR configured chairs, and AR/VR configured kits.

In embodiments, workflow management system 100 may configure (e.g., via the one or more IE devices 108A-C) the intelligent environment in such a manner as to allow a user to interact with the virtual and/or augment display. In some embodiments, one or more users may interact with the intelligent environment to identify one or more issues associated with the one or more activities associated with the workflow performed in environment 102. An issue may refer to any aspect that may impair the optimization of the workflow. Such issues may include, but are not limited to, failure or inefficiency in a particular piece of equipment or device (e.g., there is an improper concentration of chemicals applied to an object during a particular activity in the workflow), an aspect of environment 102 that may be affecting (e.g., positively or negatively) the workflow (e.g., the electrical wiring of environment 102 is such that insufficient power is provided to a milling machine, placement of the various pieces of equipment/devices), and/or identifying that the order of one or more activities of the work flow are inefficient. In these embodiments, intelligent environment may be configured in such a way as to allow one or more users to view (e.g., via one or more IE devices 108A-N) various aspects of the workflow (e.g., minutia associated with the one or more activities) in different levels of detail that may not otherwise be available to the user. For example, a user may be able to zoom in to a subtractive milling process that, due to potential projectiles and/or chemicals used, would otherwise prevent a user from observing the process closely. Enabling the one or more users to have this uninhibited or unconstrained view may allow a user to identify (e.g., via the one or more user's expertise) one or more issues associated with the one or more activities of the workflow associated with environment 102.

In these embodiments, workflow management system 100 may be configured to analyze workflow data associated with the user viewing the intelligent environment (e.g., user data/user feedback) using AI engine 104. Workflow data associated with the user may include, but is not limited to, audio and/or text issued by a user, user interactions with the intelligent environment (e.g., user hand motions or patterns in the intelligent environment associated with the one or more activities), or any combination thereof. For example, a user may produce one or more audio commands or statements regarding the intelligent environment via one or more IE devices 108A-C (e.g., user states, "activity A is not performing the proper heating and cooling sequence."). In these embodiments, workflow management system 100 may analyze this workflow data associated with one or more users' interactions with the intelligent environment and determine the one or more users' intent associated with the interaction. While in some embodiments, workflow management system 100 may determine that a user's intent is to change their point of view in the intelligent environment to allow them to see a closer view or particular aspect of an activity performed (e.g., change the vantage point from an external view of a kiln to an internal view where the object is being heated), in other embodiments, workflow management system 100 may be configured to determine a user's interactions with intelligent environment is identifying one or more issues associated with the workflow in environment 102 (e.g., one or more activities).

In embodiments, workflow management system 100 may analyze, via AI engine 104, this workflow data (e.g., user feedback) to determine if the user is indicating that a change or modification should occur to the one or more activities associated with the workflow to address the identified issue. For example, a user may use hand movements (e.g., pinching fingers to reduce or expand size) or patterns (e.g., rhythmic tapping of the fingers) to indicate some change/modification should be performed associated with the one or more activities represented in the intelligent environment of the workflow. A modification to one or more activities of the workflow may include, but are not limited to, changing the sequence of the one or more activities (e.g., changing the serial order of steps/operations, performing some steps/operations in parallel to other steps/operations, etc.), changes in equipment/devices used (e.g., alternating the equipment with backup devices, exchanging equipment for different/updated devices, etc.), changing equipment/device settings, and/or making one or more changes to environment 102 (changing the placement of equipment/devices).

In embodiments, workflow management system 100 may perform or execute the identified change or modification to the workflow (e.g., actual workflow) and/or environment 102. In some embodiments, a user may only indicate via the user interactions (e.g., user feedback) that a modification should be made (e.g., modification to change the order of the one or more activities) without first indicating or identifying the issue. In such embodiments, workflow management system 100 may determine that this instruction to modify the one or more activities of the workflow and/or environment 102 is, in itself, an identification of an issue without the user first explicitly identifying one or more issues (e.g., A user states, "the cooling element is not functioning properly.").

In some embodiments, workflow management system 100 may modify the intelligent environment of the workflow (e.g., via simulation module 112 and/or IE module 114) to reflect the identified changes/modifications the one or more users indicated (e.g., prior to performing the one or more modifications to the actual workflow). These embodiments may enable a user to view how the modification may affect the workflow prior to making those modifications in the actual/real-life workflow. Such embodiments may prevent inefficient modifications of the workflow by allowing a user to see the cause and effect of a particular modification without the process being reduced experimenting with trial and error. These embodiments would prevent unnecessary delays and inefficiencies produced by potentially superfluous or detrimental modifications. Once a user has reviewed the modifications made to the one or more activities in the intelligent environment, workflow management system 100 may be configured to determine (e.g., user feedback or requesting and receiving user approval) that the modification has been approved by the user and should be applied to the workflow in environment 102 (e.g., actual workflow). In some embodiments, workflow management system 100 may be configured to dynamically update the intelligent environment displayed to the one or more users as the various one or more modifications are executed/performed within environment 102 (e.g., changes made to the one or more activities of the workflow or environment 102).

As contemplated herein, in some embodiments, workflow management system 100 may be configured to use workflow data to generate one or more simulations (e.g., simulation module 112). These one or more simulations may be generated using any type of simulation such as digital twin simulation or virtual reality simulation. In some embodiments, workflow management system 100 may be configured to perform one or more simulations associated with the one or more activates associated with the workflow in environment 102. Workflow management system 100 may utilize these simulations to analyze and identify one or more issues associated with the one or more activities of the workflow, independent of user input. In some embodiments, these one or more issues identified may be displayed in the intelligent environment to the one or more users (e.g., using the one or more IE devices 108A-C). These issues may be visually indicated to the one or more users for easy identification. For example, workflow management system 100 may highlight the activity as it becomes visible within the intelligent environment of the workflow/environment 102. Workflow management system 100 may also be able to virtually change the color of the activity or having other symbols, such as a circle indicating the issue and where it is located within the intelligent environment.

In embodiments, workflow management system 100 may use these one or more simulations generated to determine one or more recommendations associated with the issues identified. These recommendations may include any suggested modification/change to the one or more activities and/or environment 102 that may increase efficiency and optimization of the workflow while also reducing or eliminating the identified issues. In some embodiments, workflow management system 100 may be configured to generate a simulation report. The simulation report may include the one or more issues identified regarding the one or more activities and the proposed one or more recommendations that, if implemented (e.g., the workflow is modified), may result in the workflow being optimized.

In some embodiments, workflow management system 100 may only modify the one or more activities (e.g., steps of the workflow and/or various aspects of environment 102) if an user consensus has been triggered. Requiring multiple users to confirm or approve an issue or modification ensures that there is an agreement on how to resolve or address the issue. In instances where approval or confirmation is not required, multiple users may identify the same issue but determine different manners of modifying the one or more actives/environment 102 that will similarly resolve/address the issue. While in some instances the multiple modifications may result in unnecessary changes to the one or more activates in environment 102, in other instances, having multiple modifications address the same issue may create additional issues and/or further inefficacies. In one example, three users may identify an oven (e.g., equipment/device) is not working properly (e.g., an activity is not being properly performed). In this example, a first user may determine that an alternative oven should be used, a second user may determine that the heating element (e.g., that is causing the oven not to work) should be replaced, and a third user may determine that a secondary heating device should be used to supplement the oven's heating responsibilities. Utilizing an user consensus may ensure only the most useful/optimal modification (e.g., as determined by the one or more users) are applied to the workflow.

In some embodiments, a user consensus may be triggered when a majority (e.g., simple majority or supermajority) of the one or more users agrees with an issue identified. Using the previous example, the users may identify the oven is not working properly and determine how they intend to address the issue. While in some embodiments, workflow management system may be configured to allow the one or more users to virtually collaborate in the intelligent environment to confirm/approve an issue and/or modification, in other embodiments, one or more users may indicate they have found an issue and/or how they would modify that issue. In these embodiments, workflow management system 100 may visually display (e.g., via IE devices 108A-C) the issue and/or proposed modification to the other users. The other users may then approve/disapprove of the issue and/or proposed modification or, alternatively, propose an alternative modification (e.g., that will be sent/viewable in the intelligent environment) to the issue. In such embodiments, the issues and/or modifications receiving the majority approval from the users may be confirmed and implemented in the workflow associated with environment 102.

In embodiments, workflow management system 100 may be configured to receive user feedback (e.g., workflow data) from each of the one or more users who are viewing (e.g., interacting with intelligent environment) via the one or more IE devices 108A-C associated with the one or more activities and environment 102 to determine if an user consensus has occurred. In these embodiments, workflow management system 100 may analyze this user feedback to determine if the one or more users approve or disapprove of an issue and/or modification. For example, workflow management system 100 may determine that a user is nodding their head (e.g., determined via one or more smart devices 106A-N and/or IE devices 108A-C) is providing their approval of an issue and/or modification. In some embodiments, where an user consensus is triggered by the one or more users, workflow management system 100 may be configured to identify one or more modifications to the one or more activities (e.g., actual workflow and/or environment 102) to address or resolve the one or more issues. While in some embodiments, the one or more modifications identified by workflow management system 100 may be automatically executed/performed in environment 102, in other embodiments, a user consensus may be required prior to the suggested/identified modifications are applied to the workflow in environment 102.

In embodiments, workflow management system 100 may generate the intelligent environment to multiple users (e.g., one or more users). While in some embodiments, all of the users may be authorized users, in other embodiments, fewer than all of the multiple users may be authorized users. An authorized user may be provided additional privilege while an unauthorized user may have less than privileges than the authorized user. An authorized user may be able to approve/confirm issues and/or modifications (e.g., like a user consensus majority). While in some embodiments, an unauthorized user may not be able to approve/confirm issues and/or modifications, in other embodiments, an unapproved user may be able to identify an issue, but not able to modify the workflow and/or environment 102. In instances where workflow management system 100 determines that the one or more users are authorized users, workflow management system 100 may override at least one activity of the one or more activities with the one or more modifications.

In some embodiments, once a modification has been made to the one or more activities (e.g., workflow and/or environment 102), workflow management system 100 may dynamically update the intelligent environment for the one or more users. In these embodiments, workflow management system 100 may receive additional user feedback from the one or more users regarding secondary or another issues that may be observed in the intelligent environment. If the one or more users identifies another or secondary issue, workflow management system 100 may be configured to execute or perform one or more secondary modifications to the one or more activities, using similar methods and techniques as contemplated herein.

In some embodiments, workflow management system 100 may be configured to generate the intelligent environment based, at least in part, on the type of IE device 108A-C that is to be used by the one or more users. Because the technology associated with IE devices is constantly updated with new capabilities to enhance the user's experience, workflow management system 100 may analyze (e.g., via AI engine 104 using workflow data) the parameters of the IE device (e.g., IE device 108A-C) to determine the various capabilities of the new IE device. These various capabilities may include, but are not limited to resolution (e.g., resolution per eye calculation), refresh rate (e.g., refresh rate of the headset), field of view/degree (e.g., angle of the field of view/degree) Workflow management system 100 may then be configured to tailor the intelligent environment to provide the one or more users with the best experience possible based on the capabilities of the new/updated IE devices. Such embodiments ensure the users can interact with an intelligent environment that closely reflects the reality occurring in environment 102.

Figure 2:
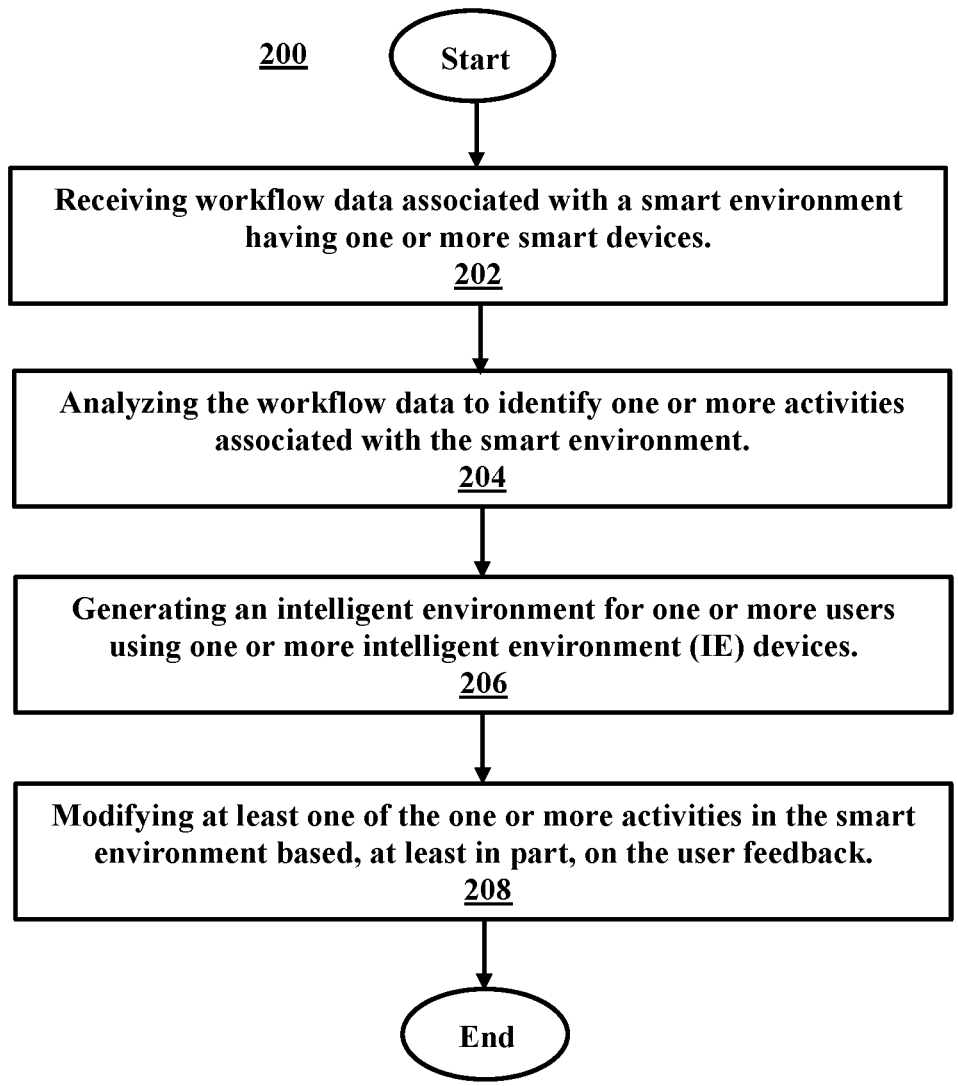
FIG. 2 illustrates a flowchart of a method for managing workflow in a environment, in accordance with embodiments of the present disclosure.

Referring now to FIG. 2, a flowchart illustrating an example method 200 for managing one or more devices in a environment (e.g., environment 102), in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In some embodiments, the method 200 begins at operation 202 where a processor may receive workflow data associated with an environment having one or more smart devices. In some embodiments, the method 200 proceeds to operation 204.

At operation 204, a processor may analyze the workflow data to identify one or more activities associated with the environment. In some embodiments, the method 200 proceeds to operation 206.

At operation 206, a processor may generate an intelligent environment for one or more users using one or more intelligent environment (IE) devices. In some embodiments, the one or more IE devices may be configured to collect user feedback from the one or more users. In some embodiments, the method 200 proceeds to operation 208.

At operation 208, a processor may modify at least one of the one or more activities in the environment based, at least in part, on the user feedback. In some embodiments, as depicted in FIG. 2, after operation 208, the method 200 may end.

In some embodiments, discussed below there are one or more operations of the method 200 not depicted for the sake of brevity and which are discussed throughout this disclosure. Accordingly, in some embodiments, the processor may generate one or more simulations of the environment and the one or more activities. In these embodiments, using the one or more simulations, the processor may identify one or more issues in the environment from the one or more simulations. In some embodiments, the one or more issues are associated with the one or more activities. The processor may then display the one or more issues in the intelligent environment using the one or more IE devices.

In some embodiments, the processor may receive the user feedback from each of the one or more users via the one or more IE devices associated with the one or more activities in the environment. In these embodiments, the processor may analyze this user feedback from each of the one or more users to determine if a user of the one or more users identified one or more issues. The processor may then determine if there is an issue consensus among the one or more users. An consensus may include a majority of the one or more users approving of the one or more issues. In some embodiments, the processor may determine if an issue consensus has occurred. Once an issue consensus has occurred, the processor may analyze the user feedback and workflow data to identify one or more identifying one or more modifications to the one or more activities, based at least in part on the one or more issues.

In some embodiments, the processor may generate a simulation of an impact associated with modifying the at least one activity of the one or more activities with one or more modifications. In embodiments, the processor may update the intelligent environment based on the one or more simulations of the impact. The processor may then determine whether the one or more users accept the one or more modifications to the one or more activities. In these embodiments, the processor may determine whether the one or more users are authorized users. In response to determining that the one or more users are authorized users, the processor may override the at least one activity of the one or more activities with the one or more modifications.

In embodiments, responsive to modifying the at least one of the one or more activities in the environment, the processor may dynamically update the intelligent environment for the one or more users. The processor may receive additional user feedback from the one or more users. The processor may then perform one or more secondary modifications to the one or more activities based, at least in part, on the additional user feedback.

It is noted that various aspects of the present disclosure are described by narrative text, flowcharts, block diagrams of computer systems and/or block diagrams of the machine logic included in computer program product (CPP) embodiments. With respect to any flowcharts (depending upon the technology involved) the operations can be performed in a different order than what is shown in the flowchart. For example, two operations shown in successive flowchart blocks may be performed in reverse order, as a single integrated step, concurrently, or in a manner at least partially overlapping in time. A computer program product embodiment ("CPP embodiment") is a term used in the present disclosure that may describe any set of one or more storage media (or "mediums") collectively included in a set of one or more storage devices. The storage media may collectively include machine readable code corresponding to instructions and/or data for performing computer operations. A "storage device" may refer to any tangible hardware or device that can retain and store instructions for use by a computer processor. Without limitation, the computer readable storage medium may include an electronic storage medium, a magnetic storage medium, an optical storage medium, an electromagnetic storage medium, a semiconductor storage medium, a mechanical storage medium, and/or any combination thereof. Some known types of storage devices that include mediums referenced herein may include a diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination thereof. A computer-readable storage medium should not be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As understood by those skilled in the art, data is typically moved at some occasional points in time during normal operations of a storage device, such as during access, de-fragmentation or garbage collection, but this does not render the storage device as transitory because the data is not transitory while it is stored.

Figure 3:
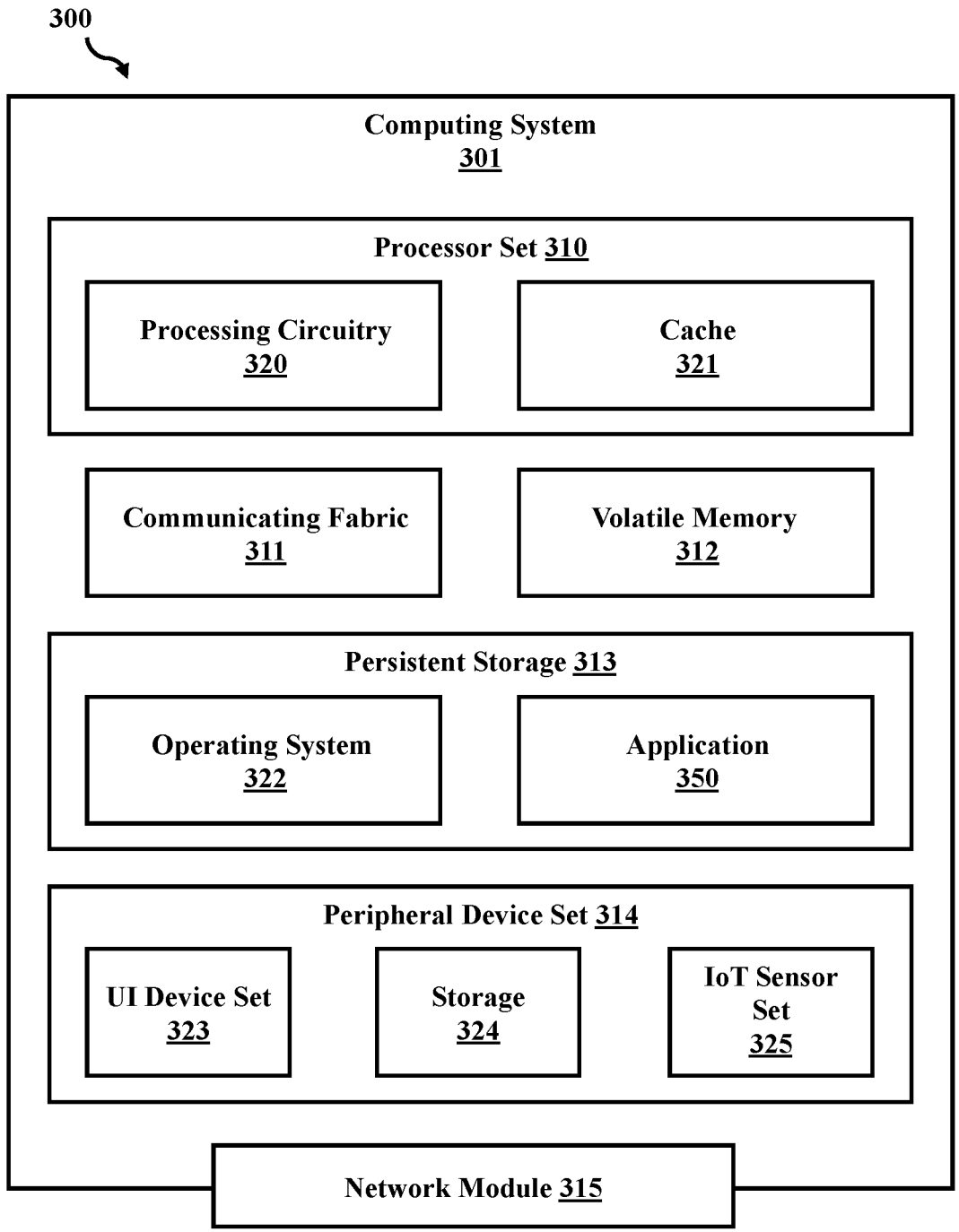
FIG. 3 depicts a block diagram illustrating an embodiment of a computer system and the components thereof, upon which embodiments described herein may be implemented in accordance with the present disclosure.

Referring now to FIG. 3, illustrated is a block diagram describing an embodiment of a computing system 301 within in a computing environment, which may be a simplified example of a computing device (i.e., a physical bare metal system and/or a virtual system) capable of performing the computing operations described herein. Computing system 301 may be representative of the one or more computing systems or devices implemented in accordance with the embodiments of the present disclosure and further described below in detail. It should be appreciated that FIG. 3 provides only an illustration of one implementation of a computing system 301 and does not imply any limitations regarding the environments in which different embodiments may be implemented. In general, the components illustrated in FIG. 3 may be representative of an electronic device, either physical or virtualized, capable of executing machine-readable program instructions.

Embodiments of computing system 301 may take the form of a desktop computer, laptop computer, tablet computer, smart phone, smart watch or other wearable computer, mainframe computer, server, quantum computer, a non-conventional computer system such as an autonomous vehicle or home appliance, or any other form of computer or mobile device now known or to be developed in the future that is capable of running a program 350, accessing a network 302 or querying a database, such as remote database 330. Performance of a computer-implemented method executed by a computing system 301 may be distributed among multiple computers and/or between multiple locations. Computing system 301 may be located as part of a cloud network, even though it is not shown within a cloud in FIGS. 3-2. Moreover, computing system 301 is not required to be in a cloud network except to any extent as may be affirmatively indicated.

Processor set 310 includes one, or more, computer processors of any type now known or to be developed in the future. Processing circuitry 320 may be distributed over multiple packages. For example, multiple, coordinated integrated circuit chips. Processing circuitry 320 may implement multiple processor threads and/or multiple processor cores. Cache 321 may refer to memory that is located on the processor chip package(s) and/or may be used for data or code that can be made available for rapid access by the threads or cores running on processor set 310. Cache 321 memories can be organized into multiple levels depending upon relative proximity to the processing circuitry 320. Alternatively, some, or all of cache 321 of processor set 310 may be located "off chip." In some computing environments, processor set 310 may be designed for working with qubits and performing quantum computing.

Computer readable program instructions can be loaded onto computing system 301 to cause a series of operational steps to be performed by processor set 310 of computing system 301 and thereby implement a computer-implemented method. Execution of the instructions can instantiate the methods specified in flowcharts and/or narrative descriptions of computer-implemented methods included in this specification (collectively referred to as "the inventive methods"). The computer readable program instructions can be stored in various types of computer readable storage media, such as cache 321 and the other storage media discussed herein. The program instructions, and associated data, can be accessed by processor set 310 to control and direct performance of the inventive methods. In computing environments of FIGS. 3-2, at least some of the instructions for performing the inventive methods may be stored in persistent storage 313, volatile memory 312, and/or cache 321, as application (s) 350 comprising one or more running processes, services, programs and installed components thereof. For example, program instructions, processes, services and installed components thereof may include the components and/or subcomponents of the system 100 as shown in FIG. 1.

Communication fabric 311 may refer to signal conduction paths that may allow the various components of computing system 301 to communicate with each other. For example, communications fabric 311 can provide for electronic communication among the processor set 310, volatile memory 312, persistent storage 313, peripheral device set 314 and/or network module 315. Communication fabric 311 can be made of switches and/or electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 may refer to any type of volatile memory now known or to be developed in the future, and may be characterized by random access, but this is not required unless affirmatively indicated. Examples include dynamic type random access memory (RAM) or static type RAM. In computing system 301, the volatile memory 312 is located in a single package and can be internal to computing system 301, but, alternatively or additionally, the volatile memory 312 may be distributed over multiple packages and/or located externally with respect to computing system 301. Application 350, along with any program(s), processes, services, and installed components thereof, described herein, may be stored in volatile memory 312 and/or persistent storage 313 for execution and/or access by one or more of the respective processor sets 310 of the computing system 301.

Persistent storage 313 can be any form of non-volatile storage for computers that may be currently known or developed in the future. The non-volatility of this storage means that the stored data may be maintained regardless of whether power is being supplied to computing system 301 and/or directly to persistent storage 313. Persistent storage 313 may be a read only memory (ROM), however, at least a portion of the persistent storage 313 may allow writing of data, deletion of data and/or re-writing of data. Some forms of persistent storage 313 may include magnetic disks, solid-state storage devices, hard drives, flash-based memory, erasable read-only memories (EPROM) and semi-conductor storage devices. Operating system 322 may take several forms, such as various known proprietary operating systems or open-source Portable Operating System Interface type operating systems that employ a kernel.

Peripheral device set 314 includes one or more peripheral devices connected to computing system 301. For example, via an input/output (I/O interface). Data communication connections between the peripheral devices and the other components of computing system 301 may be implemented using various methods. For example, through connections using Bluetooth, Near-Field Communication (NFC), wired connections or cables (such as universal serial bus (USB) type cables), insertion type connections (for example, secure digital (SD) card), connections made though local area communication networks and/or wide area networks such as the internet. In various embodiments, UI device set 323 may include components such as a display screen, speaker, microphone, wearable devices (such as goggles, headsets and smart watches), keyboard, mouse, printer, touchpad, game controllers, and haptic feedback devices. Storage 324 can include external storage, such as an external hard drive, or insertable storage, such as an SD card. Storage 324 may be persistent and/or volatile. In some embodiments, storage 324 may take the form of a quantum computing storage device for storing data in the form of qubits. In some embodiments, networks of computing systems 301 may utilize clustered computing and components acting as a single pool of seamless resources when accessed through a network by one or more computing systems 301. For example, a storage area network (SAN) that is shared by multiple, geographically distributed computer systems 301 or network-attached storage (NAS) applications. IoT sensor set 325 can be made up of sensors that can be used in Internet-of-Things applications. For example, a sensor may be a temperature sensor, motion sensor, infrared sensor or any other type of known sensor type.

Network module 315 may include a collection of computer software, hardware, and/or firmware that allows computing system 301 to communicate with other computer systems through a network 302, such as a LAN or WAN. Network module 315 may include hardware, such as modems or Wi-Fi signal transceivers, software for packetizing and/or de-packetizing data for communication network transmission, and/or web browser software for communicating data over the network. In some embodiments, network control functions and network forwarding functions of network module 315 are performed on the same physical hardware device. In other embodiments (for example, embodiments that utilize software-defined networking (SDN)), the control functions and the forwarding functions of network module 315 can be performed on physically separate devices, such that the control functions manage several different network hardware devices. Computer readable program instructions for performing the inventive methods can typically be downloaded to computing system 301 from an external computer or external storage device through a network adapter card or network interface included in network module 315.

Figure 4:
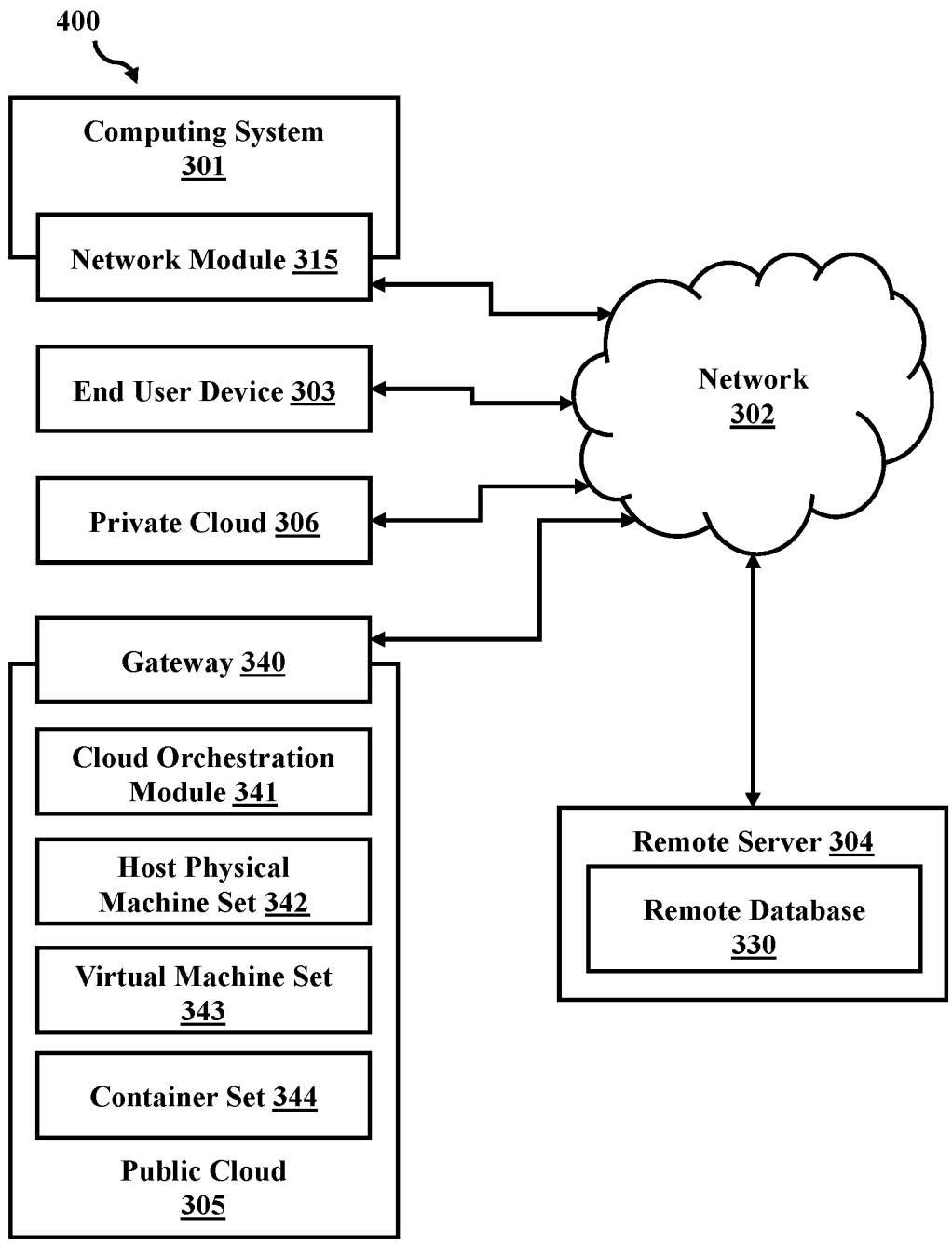
FIG. 4 depicts a block diagram illustrating an extension of the computing system environment of FIG. 3, wherein the computer systems are configured to operate in a network environment (including a cloud environment), and perform methods described herein in accordance with the present disclosure.

Continuing, FIG. 4 depicts a computing environment 400 which may be an extension of the computing environment 300 of FIG. 3, operating as part of a network. In addition to computing system 301, computing environment 400 can include a network 302 such as a wide area network (WAN) (or another type of computer network) connecting computing system 301 to an end user device (EUD) 303, remote server 304, public cloud 305, and/or private cloud 306. In this embodiment, computing system 301 includes processor set 310 (including processing circuitry 340 and cache 321), communication fabric 311, volatile memory 312, persistent storage 313 (including operating system 322 and program(s) 350, as identified above), peripheral device set 314 (including user interface (UI), device set 323, storage 324, Internet of Things (IoT) sensor set 325), and network module 315. Remote server 304 includes remote database 330. Public cloud 305 includes gateway 340, cloud orchestration module 341, host physical machine set 342, virtual machine set 343, and/or container set 344.

Network 302 may be comprised of wired or wireless connections. For example, connections may be comprised of computer hardware such as copper transmission cables, optical transmission fibers, wireless transmission, routers, firewalls, switches, gateway computers and/or edge servers. Network 302 may be described as any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. Other types of networks that can be used to interconnect the various computer systems 301, end user devices 303, remote servers 304, private cloud 306 and/or public cloud 305 may include Wireless Local Area Networks (WLANs), home area network (HAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 301.

End user device 303 can include any computer device that can be used and/or controlled by an end user (for example, a customer of an enterprise that operates computing system 301) and may take any of the forms discussed above in connection with computing system 301. EUD 303 may receive helpful and useful data from the operations of computing system 301. For example, in a hypothetical case where computing system 301 is designed to provide a recommendation to an end user, this recommendation may be communicated from network module 315 of computing system 301 through WAN 302 to EUD 303. In this example, EUD 303 can display, or otherwise present, the recommendation to an end user. In some embodiments, EUD 303 may be a client device, such as thin client, thick client, mobile computing device such as a smart phone, mainframe computer, desktop computer and so on.

Remote server 304 may be any computing systems that serves at least some data and/or functionality to computing system 301. Remote server 304 may be controlled and used by the same entity that operates computing system 301. Remote server 304 represents the machine(s) that collect and store helpful and useful data for use by other computers, such as computing system 301. For example, in a hypothetical case where computing system 301 is designed and programmed to provide a recommendation based on historical data, the historical data may be provided to computing system 301 from remote database 330 of remote server 304.

Public cloud 305 may be any computing systems available for use by multiple entities that provide on-demand availability of computer system resources and/or other computer capabilities including data storage (cloud storage) and computing power, without direct active management by the user. The direct and active management of the computing resources of public cloud 305 can be performed by the computer hardware and/or software of cloud orchestration module 341. The computing resources provided by public cloud 305 can be implemented by virtual computing environments that run on various computers making up the computers of host physical machine set 342, and/or the universe of physical computers in and/or available to public cloud 305. The virtual computing environments (VCEs) may take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through network 302.

VCEs can be stored as "images." A new active instance of the VCE can be instantiated from the image. Two types of VCEs may include virtual machines and containers. A container is a VCE that uses operating-system-level virtualization, in which the kernel allows the existence of multiple isolated user-space instances, called containers. These isolated user-space instances may behave as physical computers from the point of view of programs 350 running in them. An application 350 running on an operating system 322 can utilize all resources of that computer, such as connected devices, files and folders, network shares, CPU power, and quantifiable hardware capabilities. Applications 350 running inside a container of container set 344 may only use the contents of the container and devices assigned to the container, a feature which may be referred to as containerization.

Private cloud 306 may be similar to public cloud 305, except that the computing resources may only be available for use by a single enterprise. While private cloud 306 is depicted as being in communication with network 302 (such as the Internet), in other embodiments a private cloud 306 may be disconnected from the internet entirely and only accessible through a local/private network. A hybrid cloud may refer to a composition of multiple clouds of different types (for example, private, community or public cloud types), and the plurality of clouds may be implemented or operated by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 may be both part of a larger hybrid cloud environment.

What is claimed is:

1. A computer-implemented method, the method comprising:
    receiving, by a processor, workflow data associated with an environment having one or more smart devices;
    analyzing the workflow data to identify one or more activities associated with the environment;
    generating an intelligent environment for one or more users using one or more intelligent environment (IE) devices, wherein the one or more IE devices are configured to collect user feedback from the one or more users;
    modifying at least one of the one or more activities in the environment based, at least in part, on the user feedback;
    receiving the user feedback from each of the one or more users using the one or more IE devices associated with the one or more activities in the environment;
    analyzing the user feedback from each of the one or more users to determine whether a user of the one or more users identified one or more issues; and
    determining whether there is an issue consensus among the one or more users, wherein an issue consensus includes a majority of the one or more users approving of the one or more issues.

2. The method of claim 1, further comprising:
    generating one or more simulations of the environment and the one or more activities;
    identifying one or more issues in the environment from the one or more simulations, wherein the one or more issues are associated with the one or more activities; and
    displaying the one or more issues in the intelligent environment using the one or more IE devices.

3. The method of claim 1, further including: determining the issue consensus has occurred; analyzing the user feedback and the workflow data; and identifying one or more modifications to the one or more activities, based at least in part on the one or more issues.

4. The method of claim 1, further comprising:
    generating a simulation of an impact associated with modifying the at least one activity of the one or more activities with one or more modifications;
    updating the intelligent environment, based on the one or more simulations of the impact; and
    determining whether the one or more users accept the one or more modifications to the one or more activities.

5. The method of claim 4, further comprising:
    determining whether the one or more users are authorized users;
    overriding the at least one activity of the one or more activities, responsive to determining the one or more users are authorized users, with the one or more modifications.

6. The method of claim 1, further comprises:
    dynamically updating the intelligent environment for the one or more users, responsive to modifying the at least one of the one or more activities in the environment;
    receiving additional user feedback from the one or more users; and
    performing one or more secondary modifications to the one or more activities based, at least in part, on the additional user feedback.

7. A system, the system comprising:
    a memory; and
    a processor in communication with the memory, the processor being configured to perform operations comprising:
        receiving workflow data associated with an environment having one or more smart devices;
        analyzing the workflow data to identify one or more activities associated with the environment;
        generating an intelligent environment for one or more users using one or more intelligent environment (IE) devices, wherein the one or more IE devices are configured to collect user feedback from the one or more users;
        modifying at least one of the one or more activities in the environment based, at least in part, on the user feedback;
        receiving the user feedback from each of the one or more users using the one or more IE devices associated with the one or more activities in the environment;
        analyzing the user feedback from each of the one or more users to determine whether a user of the one or more users identified one or more issues; and
        determining whether there is an issue consensus among the one or more users, wherein an issue consensus includes a majority of the one or more users approving of the one or more issues.

8. The system of claim 7, further comprising:
    generating one or more simulations of the environment and the one or more activities;
    identifying one or more issues in the environment from the one or more simulations, wherein the one or more issues are associated with the one or more activities; and
    displaying the one or more issues in the intelligent environment using the one or more IE devices.

9. The system of claim 7, further including: determining the issue consensus has occurred; analyzing the user feedback and the workflow data; and identifying one or more modifications to the one or more activities, based at least in part on the one or more issues.

10. The system of claim 7, further comprising:
    generating a simulation of an impact associated with modifying the at least one activity of the one or more activities with one or more modifications;
    updating the intelligent environment, based on the one or more simulations of the impact; and
    determining whether the one or more users accept the one or more modifications to the one or more activities.

11. The system of claim 10, further comprising:
    determining whether the one or more users are authorized users;
    overriding the at least one activity of the one or more activities, responsive to determining the one or more users are authorized users, with the one or more modifications.

12. The system of claim 7, further comprises:
    dynamically updating the intelligent environment for the one or more users, responsive to modifying the at least one of the one or more activities in the environment;

receiving additional user feedback from the one or more users; and performing one or more secondary modifications to the one or more activities based, at least in part, on the additional user feedback.

13. A computer program product comprising a computer readable storage medium having program instructions embodied therewith, the program instructions executable by a processor to cause the processor to perform operations, the operations comprising:

receiving workflow data associated with an environment having one or more smart devices;

analyzing the workflow data to identify one or more activities associated with the environment;

generating an intelligent environment for one or more users using one or more intelligent environment (IE) devices, wherein the one or more IE devices are configured to collect user feedback from the one or more users;

modifying at least one of the one or more activities in the environment based, at least in part, on the user feedback;

receiving the user feedback from each of the one or more users using the one or more IE devices associated with the one or more activities in the environment;

analyzing the user feedback from each of the one or more users to determine whether a user of the one or more users identified one or more issues; and determining whether there is an issue consensus among the one or more users, wherein an issue consensus includes a majority of the one or more users approving of the one or more issues.

14. The computer program product of claim 13, further comprising:

generating one or more simulations of the environment and the one or more activities;

identifying one or more issues in the environment from the one or more simulations, wherein the one or more issues are associated with the one or more activities; and displaying the one or more issues in the intelligent environment using the one or more IE devices.

15. The computer program product of claim 13, further including: determining the issue consensus has occurred; analyzing the user feedback and the workflow data; and identifying one or more modifications to the one or more activities, based at least in part on the one or more issues.

16. The computer program product of claim 13, further comprising:

generating a simulation of an impact associated with modifying the at least one activity of the one or more activities with one or more modifications;

updating the intelligent environment, based on the one or more simulations of the impact; and determining whether the one or more users accept the one or more modifications to the one or more activities.

17. The computer program product of claim 16, further comprising:

determining whether the one or more users are authorized users;

overriding the at least one activity of the one or more activities, responsive to determining the one or more users are authorized users, with the one or more modifications.

\* \* \* \* \*